United States Patent Office 3,629,479
Patented Dec. 21, 1971

3,629,479
SULFOALKYLATED POLYBENZIMIDAZOLES
Jeno C. Szita, Stamford, Conn., and Carl S. Marvel, Tucson, Ariz., assignors to Research Corporation, New York, N.Y.
No Drawing. Filed Nov. 28, 1969, Ser. No. 880,986
Int. Cl. C08g 33/02; D06p 5/00
U.S. Cl. 260—79.3 R  3 Claims

ABSTRACT OF THE DISCLOSURE

Polybenzimidazoles are sulfoalkylated by reaction with propane- and butanesultones. The sulfoalkylated products, unlike the parent polymers, are receptive to dyeing with cationic dyestuffs.

---

This invention relates to the sulfoalkylation of polybenzimidazoles and to the novel polymeric compositions thereby produced.

Polybenzimidazole, more systematically known as poly-2,2' - (m-phenylene)-5,5'-bisbenzimidazole, was first prepared by Vogel and Marvel, J. Polymer Sci., 50, 511 (1961). As described in U.S. Pat. 3,174,947, the polybenzimidazoles are relatively high melting organic polymers which can be spun into fibers and made into cloth capable of withstanding the adverse effects of elevated temperatures.

Heretofore, polybenzimidazoles have not been receptive to dyeing with basic or cationic dyestuffs. We have now discovered a method for sulfoalkylating polybenzimidazoles which makes them receptive to such dyeing. The presence of sulfoalkyl groups also substantially increases the hydrophilic character of the polymer. Hydrophilicity is a desirable property for many applications other than dyeing, e.g., reverse osmosis in whole fibers.

In one aspect, the present invention is a method for the preparation of sulfoalkylated polybenzimidazoles which comprises heating a polybenzimidazole with an alkanesultone at 20–150° C. and preferably at 100–150° C.

In another aspect, the present invention is a polymeric composition characterized by the repeating structural units

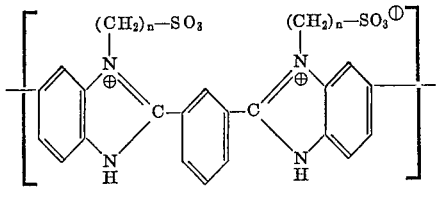

and/or

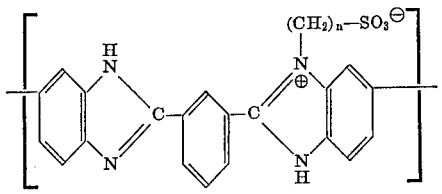

wherein $n$ is 3 or 4.

According to the method of the present invention, a polybenzimidazole dissolved in a solvent such as dimethylacetamide, or in the solid state as a fiber or cloth, is heated at 20–150° C., preferably 100–150° C., with propane- or butanesultone. The sulfoalkylated polybenzimidazole generally precipitates from solution during the course of the reaction and is separated by filtration, washed free of reactants and dried. When polybenzimidazole fiber or cloth is sulfoalkylated in the solid state, the sulfoalkylated material is removed from the hot treating bath and preferably drained prior to washing and drying. Analysis of the sulfoalkylate indicates that one or both of the nitrogens present in each repeating polymeric structural unit is quaternized.

Our invention is further illustrated by means of the following on-limiting examples:

(1) Alkylation in solution 18 mg. (0.06 mmole) of polybenzimidazole film ($\eta_{inh}=0.8$ in 0.5% dimethylsulfoxide) was dissolved in 1 ml. of dimethylacetamide at 40–50° C. and added to a solution of 72 mg. (0.6 mmole) of propanesultone in the same solvent. The reaction mixture was heated for 20 minutes to 140° C. and maintained at 135–140° C. for one hour (sulfoalkylated product began to precipitate after about 15 minutes of heating). The reaction mixture was then kept at 100–105° C. for 18 hours. The pale yellow product was collected by filtration, washed several times with warm dimethylacetamide and benzene, and dried in a vacuum oven at 60–70° C. The yield of sulfoalkylated polybenzimidazole fiber was 25 mg.

*Analysis.*—Found (percent): C, 58.19; H, 4.86; N, 11.56; S, 8.74.

*Analysis.*—Calcd. for $C_{23}H_{20}N_4O_3S$ (percent): (one nitrogen alkylated per polymer unit): C, 63.90; H, 4.66; N, 12.92; S, 7.42.

*Analysis.*—Calcd. for $C_{49}H_{46}N_8O_9S_3$ (percent): (1.5 nitrogen alkylated per polymer unit): C, 59.60; H, 4.70; N, 11.35; S, 9.75.

*Analysis.*—Calcd. for $C_{26}H_{26}N_4O_6S_2$ (percent): (two nitrogens alkylated per polymer unit): C, 56.27; H, 4.74; N, 10.11; S, 11.57.

(2) Alkylation of fiber in the solid state

In a mixture of 2 ml. of dimethylacetamide and 0.122 g. (1.0 mmole) of propanesultone was placed 31 mg. (0.1 mmole) of commercially available polybenzimidazole fiber. The temperature was raised over a period of 90 minutes to 95–100° C. and kept at that temperature for 16 hours and at 140° C. for 2 hours. No dissolution of the fiber was observed. The fiber was removed from the reaction mixture, drained free of reactants and washed and dried as in the previous example. The yield of sulfoalkylated polybenzimidazole fiber was 45 mg.

*Analysis.*—Found (percent): C, 59.17; H, 4.75; N, 11.63; S, 7.79.

(3) Alkylation of cloth

In a mixture of 25 g. (0.2 mole) of propanesultone and 100 ml. of dimethylacetamide were placed 3 pieces of commercially available polybenzimidazole cloth each weighing about 0.5 g. The reaction mixture was kept at room temperature for 30 minutes then over the next 30 minutes the temperature was raised from 26 to 100° C. One piece of cloth (I) was removed after 10 minutes. After another 20 minutes at 100° C., the temperature was raised to 140° C. over a period of 30 minutes and a second piece of cloth (II) was removed. The last piece of cloth (III) was removed after 24 hours at 140° C. Immediately after reaction, each piece of cloth was washed several times with hot dimethylacetamide and benzene and dried in a vacuum oven at 70° C. Samples from the three pieces analyzed as follows:

|     | Percent C | Percent H | Percent N | Percent S |
|-----|-----------|-----------|-----------|-----------|
| I   | 67.44     | 4.04      | 15.03     | 2.24      |
| II  | 58.91     | 4.85      | 11.72     | 7.43      |
| III | 56.54     | 5.43      | 11.46     | 10.18     |

The table which follows summarizes the results obtained when polybenzimidazole cloth was sulfoalkylated in a 4:1 by weight mixture of dimethylacetamide and propanesultone containing a 40 molar excess of sultone per recurring polymer unit under various reaction conditions:

| Reaction conditions | | Elemental analysis | | | | Calc'd degree of alkylation per polymer unit |
|---|---|---|---|---|---|---|
| Time, min. | Temp., (° C.) | Percent C | Percent H | Percent N | Percent S | |
| 30 | 26 | | | | | |
| 20 | 26–80 | | | | | |
| 15 | 80 | 74.38 | 4.10 | 17.39 | 0.18 | 0.04 |
| 30 | 26 | | | | | |
| 35 | 26–80 | | | | | |
| 180 | 100 | 70.53 | 4.45 | 15.58 | 2.61 | 0.25 |
| 30 | 26 | | | | | |
| 30 | 26–10 | | | | | |
| 10 | 100 | 67.44 | 4.04 | 15.03 | 2.24 | 0.25 |
| 10 | 100 | 70.61 | 4.50 | 15.25 | 2.45 | 0.25 |
| 30 | 26 | | | | | |
| 35 | 26–80 | | | | | |
| 180 | 100 | 61.24 | 5.32 | 13.49 | 6.04 | 1.0 |
| 30 | 26 | | | | | |
| 60 | 26–100 | | | | | |
| 30 | 100–140 | | | | | |
| 1,440 | 140 | 56.54 | 5.43 | 11.46 | 10.18 | 2.0 |

The examples indicate that the degree of alkylation is between one and two propanesultones per recurring polymer structural unit and that there is little difference in result whether the reaction is started in a homogeneous or heterogeneous media. Analogous results are obtained when butanesultone is used in place of propanesultone as the sulfoalkylating agent.

The sulfoalkylated polybenzimidazole product is insuluble in organic solvents such as dimethylformamide, dimethylacetamide and dimethyl sulfoxide. Although very hygroscopic, the product polymers are not soluble in water or alkali but are soluble 55% aqueous zinc chloride.

The dyeing of polybenzimidazole cloth having different degrees of sulfoalkylation was carried out with the cationic dye Basic Blue 4 "Sevron" Blue 5G, Color Index, #51004, page 3423, vol. 3, 2nd ed. (1956). The dye solution was prepared by adding 0.1 g. of sodium acetate and 3 drops of acetic acid to 150 ml. of distilled water to adjust the pH to 4.0–4.5 and finally 0.1 g. of "Sevron" Blue 5G. The mixture was heated to full boiling and the test samples were then rinsed with water and dried. Sulfoalkylated cloth samples having a sulfur content of 6% or higher were dyed a very deep blue; those with 2.0–2.5% sulfur were dyed to intermediate shades. Essentially no dye was affixed to the unsulfoalkylated polybenzimidazole cloth control.

Other variations in our method will suggest themselves to those skilled in the art and our invention is as claimed.

We claim:
1. A sulfoalkylated polybenzimidazole consisting essentially of the recurring structural units:

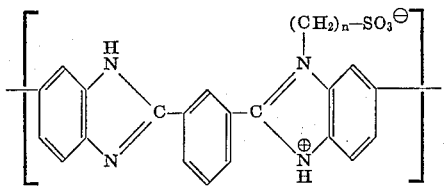

or

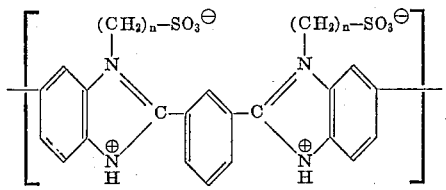

wherein $n$ is 3 or 4.

2. A sulfoalkylated polybenzimidazole consisting essentially of the recurring structural unit:

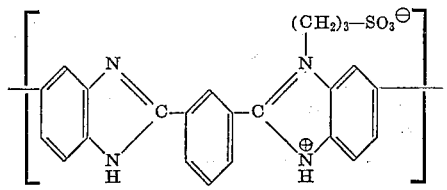

3. A sulfoalkylated polybenzimidazole consisting essentially of the recurring structural unit:

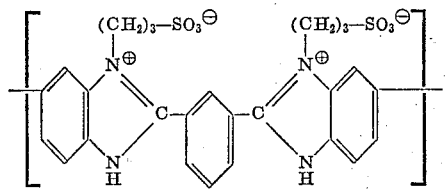

References Cited

UNITED STATES PATENTS 3,174,947   2/1962   Marvel _____ 260—47
3,399,249   8/1968   Hostetler _____ 260—878

JOSEPH L. SCHOFER, Primary Examiner
C. A. HENDERSON, Jr., Assistant Examiner

U.S. Cl. X.R.

8—168; 260—32.6 N, 78 TF, 78.4 R